United States Patent
Noda et al.

(10) Patent No.: US 9,507,414 B2
(45) Date of Patent: Nov. 29, 2016

(54) INFORMATION PROCESSING DEVICE, INFORMATION PROCESSING METHOD, AND PROGRAM

(75) Inventors: Takuro Noda, Tokyo (JP); Akihiro Komori, Tokyo (JP); Nariaki Satoh, Kanagawa (JP); Osamu Shigeta, Tokyo (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1180 days.

(21) Appl. No.: 13/207,778

(22) Filed: Aug. 11, 2011

(65) Prior Publication Data

US 2012/0047466 A1 Feb. 23, 2012

(30) Foreign Application Priority Data

Aug. 19, 2010 (JP) ................ P2010-184006

(51) Int. Cl.
*G06F 1/00* (2006.01)
*G06F 3/01* (2006.01)

(52) U.S. Cl.
CPC .................... *G06F 3/011* (2013.01)

(58) Field of Classification Search
USPC .................................. 345/173–179
See application file for complete search history.

(56) References Cited

U.S. PATENT DOCUMENTS

| 6,154,758 A * | 11/2000 | Chiang ........................ 715/263 |
| 2006/0187196 A1* | 8/2006 | Underkoffler .......... G06F 3/017 345/156 |
| 2008/0204407 A1* | 8/2008 | Ueno ........................... 345/156 |
| 2011/0159915 A1* | 6/2011 | Yano et al. ................ 455/550.1 |

FOREIGN PATENT DOCUMENTS

| JP | 2008-530661 | 8/2008 |
| JP | 2009-528514 | 8/2009 |

* cited by examiner

*Primary Examiner* — Michael Faragalla
(74) *Attorney, Agent, or Firm* — Paratus Law Group, PLLC

(57) ABSTRACT

There is provided an information processing device including an acquisition section configured to acquire an operation vector based on a movement of a body part of a user, a correction section configured to correct a direction of the acquired operation vector, and a process execution section configured to execute a process in accordance with the corrected operation vector.

17 Claims, 10 Drawing Sheets

INFORMATION PROCESSING DEVICE, INFORMATION PROCESSING METHOD, AND PROGRAM

BACKGROUND

The present disclosure relates to an information processing device, an information processing method, and a program. In particular, the present disclosure relates to an information processing device, an information processing method, and a program for acquiring an operation instruction based on a movement of the body of a user.

In recent years, technologies for acquiring an operation instruction to an information processing device such as a PC (Personal Computer) based on a movement of the body of a user have been developed. A movement of the body of a user is acquired by, for example, recognizing a body part such as a hand of a user through an image analysis or the like using a marker attached to the user, a controller gripped by the user, or speckle patterns and further identifying the position of the recognized body part using a three-dimensional measurement method such as triangulation or TOF (Time Of Flight).

As an example of such technologies, JP 2009-528514A discloses a technology of using a gesture of a user, which has been identified through an image analysis using speckle patterns, as an input to a computer application. In addition, JP 2008-530661A discloses a technology of mapping a physical space in which a user exists onto a virtual space on a system and reflecting a movement of the user acquired in the physical space into a cursor control.

SUMMARY

However, when a user attempts to move his/her hand in the left-to-right direction while stretching the arm horizontally, the movement path of the hand will be an approximately arcuate line that is based on a shoulder joint as the center, which means that a natural body movement of a user is not necessarily linear. In contrast, in many applications of PCs and the like, movements in straight lines in, for example, the horizontal direction, the vertical direction, or the depth direction are predicted.

Therefore, when a movement of the body of a user is used as an operation instruction to an information processing device as disclosed in JP 2009-528514A and JP 2008-530661A, for example, there is a problem in that even when the user intends to move his/her body in a straight line, the actual movement of the body will not be linear, and thus it is difficult to acquire an operation instruction as intended by the user.

In light of the foregoing, it is desirable to provide an information processing device, an information processing method, and a program, which are novel and improved and which can acquire a desired operation instruction from a natural body movement of the user.

According to an embodiment of the present disclosure, there is provided an information processing device including an acquisition section configured to acquire an operation vector based on a movement of a body part of a user, a correction section configured to correct a direction of the acquired operation vector, and a process execution section configured to execute a process in accordance with the corrected operation vector.

According to such a configuration, it is possible to, with a given function provided by the information processing device, acquire from a natural body movement of the user an operation instruction for a direction that is desired by the user, and to control the information processing device as desired without the need for the user to consciously adjust the movement of his/her body.

The correction section may correct the direction of the acquired operation vector to any of one or a plurality of directions determined in advance for the process.

The correction section may correct the direction of the operation vector when an angle is less than a first threshold, the angle is an angle between the direction of the acquired operation vector and any of the one or the plurality of directions determined in advance for the process.

The acquisition section may acquire the operation vector as a vector going from a start point to an end point of a movement of the body part in a unit time based on which the acquisition section performs the process.

The correction section may correct the direction of the acquired operation vector when a magnitude of the acquired vectors is greater than a second threshold.

The acquisition section may acquire a position of a center part of the body of the user, and the correction section may correct the direction of the acquired operation vector for a movement of the body part in a region whose distance from the position of the center part of the body is greater than a third threshold.

The acquired operation vector may be a three-dimensional vector containing components in at least one of a width direction, a height direction, and a depth direction of a three-dimensional space in which the user is located.

The information processing device may further include a display control section configured to display an object in a virtual tree-dimensional space, and the process execution section may move the object displayed by the display control section in accordance with the corrected operation vector.

The correction section may correct the direction of the acquired operation vector to any one of the width direction, the height direction, and the depth direction of the virtual three-dimensional space.

The correction section may correct the direction of the operation vector when the direction of the acquired operation vector makes an angle that is less than a forth threshold with one of the width direction, the height direction, and the depth direction of the virtual three-dimensional space.

According to another embodiment of the present disclosure, there is provided an information processing method including acquiring an operation vector based on a movement of a body part of a user, correcting a direction of the acquired operation vector, and executing a process in accordance with the corrected operation vector.

According to still another embodiment of the present disclosure, there is provided a program for causing a computer to function as an acquisition section configured to acquire an operation vector based on a movement of a body part of a user, a correction section configured to correct a direction of the acquired operation vector, and a process execution section configured to execute a process in accordance with the corrected operation vector.

According to the embodiments of the present disclosure described above, a desired operation instruction can be acquired from a natural body movement of a user.

DETAILED DESCRIPTION OF THE EMBODIMENTS

Figure 1:
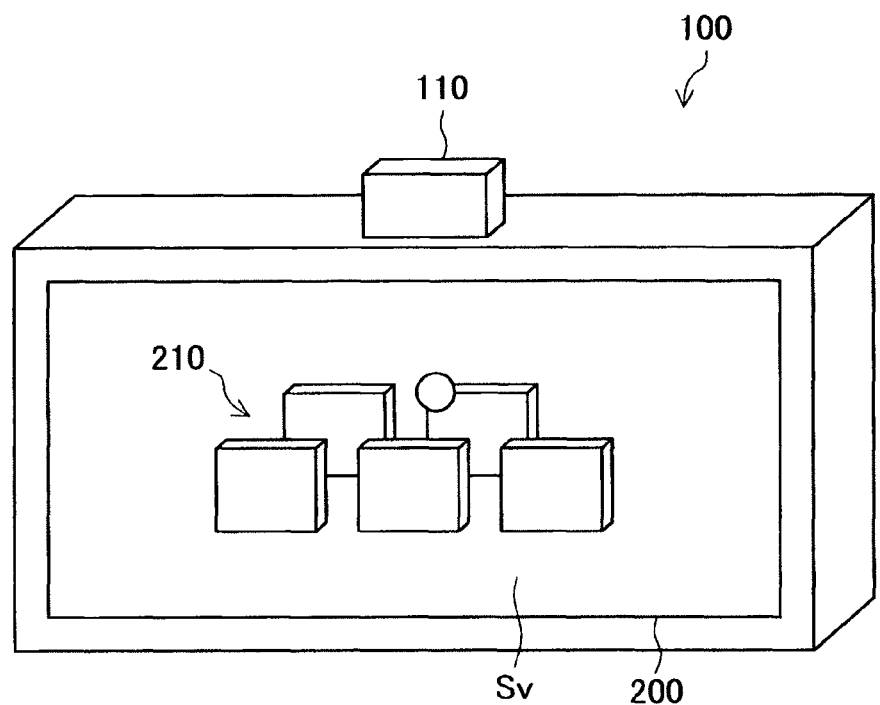
FIG. 1 is a diagram showing a schematic configuration of a system including an information processing device in accordance with one embodiment of the present disclosure.
Figure 1:
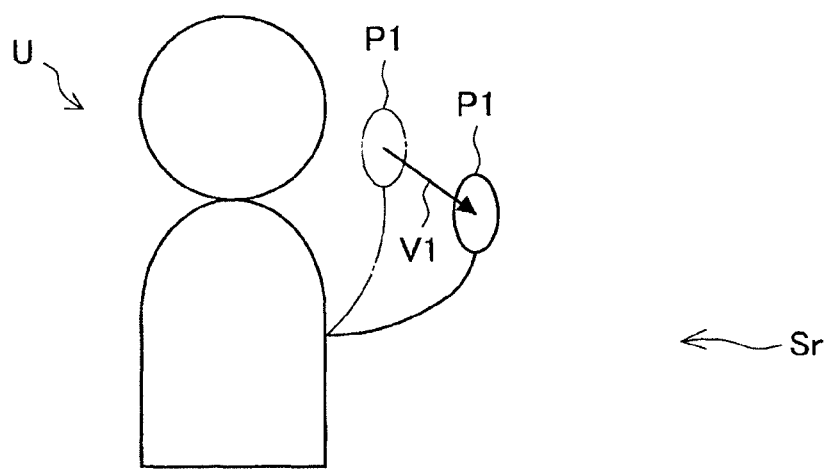
Figure 1:
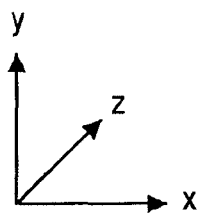

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Device Configuration
2. Correction of Operation Vector
2-1. Determination based on Direction
2-2. Determination based on Magnitude
2-3. Determination based on Position
2-4. Determination for Plurality of Directions
3. Variations
3-1. Variation of Correction Pattern (1)
3-2. Variation of Correction Pattern (2)
4. Conclusion

1. DEVICE CONFIGURATION

First, a device configuration in accordance with one embodiment of the present disclosure will be described with reference to FIGS. 1 and 2.

FIG. 1 is a diagram showing a schematic configuration of a system including an information processing device 100 in accordance with one embodiment of the present disclosure. Referring to FIG. 1, the information processing device 100 is operated by a user U located in a three-dimensional space Sr. A display screen 200 that is controlled by the information processing device 100 is presented to the user U. On the display screen 200, an object 210 is displayed in a virtual three-dimensional space Sv. The user U moves a body part P1 as an operation instruction to the information processing device 100 for moving the object 210. An acquisition section 110 of the information processing device 100 acquires an operation vector V1 based on the movement of the body part P1.

(Exemplary System Configuration)

The information processing device 100 is, for example, a PC or a television. Although the information processing device 100 is shown as a chassis integrated with the acquisition section 110 and the display screen 200, the information processing device 100 is not limited thereto. For example, the acquisition section 110 and the display screen 200 can be provided separately from other sections and connected thereto with cables or the like. Alternatively, it is also possible to provide only the acquisition section 110 and the display screen 200 in the same place as the user U and provide the other sections in a different place so that the other sections are connected to the acquisition section 110 and the display screen 200 via a network.

The user U is an operator of the information processing device 100. The user U is located in the three-dimensional space Sr. In the three-dimensional space Sr, the width direction, the height direction, and the depth direction seen from the user U who is located opposite the acquisition section 110 are defined as the x-axis direction, the y-axis direction, and the z-axis direction, respectively. The user U moves a body part P1 in the three-dimensional space Sr. Herein, the body part P1 is a right hand of the user U.

Note that the number of the user U need not necessarily be one and can be more than one. In addition, the body part P1 can be another body part of the user U such as, for example, a left hand, foot, knee, elbow, head, or face. Further, a plurality of body parts such as a right hand and a left hand of a single user U can be recognized. When body parts P of a plurality of users U are recognized or when a plurality of body parts P of a single user U are recognized, the information processing device 100 can either acquire an operation vector V1 from each of the plurality of body parts P or acquire a single operation vector V1 from the entirety of the plurality of body parts P1.

The operation vector V1 is a vector that is based on a movement of the body part P1. The operation vector V1 is acquired as a vector going from the start point to the end point of a movement of the body part P1 in a given time. The given time refers to, for example, a unit time based on which the acquisition section 110 of the information processing device 100 performs a process.

The operation vector V1 is a three-dimensional vector in the three-dimensional space Sr. Thus, the operation vector V1 can contain components in each of the x-axis direction, the y-axis direction, and the z-axis direction. The operation vector V1 need not necessarily be a three-dimensional vector. For example, the operation vector V1 can be a two-dimensional vector that is obtained by dimension-compressing a three-dimensional vector in the three-dimensional space Sr, namely, a vector that contains components in only the x-axis direction and the y-axis direction.

The display screen 200 can be, for example, a LCD (Liquid Crystal Display), a PDP (Plasma Display Panel), or an organic EL (Electro-Luminescence) panel. The display screen 200 displays objects 210 in the virtual three-dimensional space Sv. The virtual three-dimensional space Sv has a coordinate system corresponding to the three-dimensional space Sr in which the user U is located. Specifically, the width direction, the height direction, and the depth direction of the display screen 200 are defined as the x-axis, the y-axis, and the z-axis, respectively. What is displayed on the display screen 200 need not necessarily be the virtual three-dimensional space Sv and can be, for example, a two-dimensional plane, in which case the operation vector V1 acquired as a three-dimensional vector is compressed in dimension so that it is used as a two-dimensional vector for a process.

Although the display screen 200 is shown as a part of the information processing device 100, the display screen 200 is not limited thereto. For example, the display screen 200 can have an independent chassis and can be connected to the information processing device 100 with a cable or the like. In addition, when the information processing device 100 does not control the display screen 200 as described below, the display screen 200 need not be included in the system.

(Exemplary System Operation)

In a system such as the one described above, the information processing device 100 provides the user U with, for example, a function of playing back movie content, music content, or the like. When such a content playback function is provided, the objects 210 are displayed in the virtual three-dimensional space Sv as the content, a pointer for selecting the content, and a button representing an operation to be executed on the content. The objects 210 representing the content are arranged in the x-axis direction, the y-axis direction, and the z-axis direction in the virtual three-dimensional space Sv.

First, the user U moves the object 210 representing the pointer through an operation using a movement of the body part P1. The acquisition section 110 of the information processing device 100 acquires the operation vector V1 based on the movement of the body part P1 in the three-dimensional space Sr.

Next, the user U superimposes the object 210 representing the pointer on the object 210 representing the desired content, and performs an operation of selecting the object 210. For example, the acquisition section 110 of the information processing device 100 recognizes an operation of the body part P1 in addition to the position of the body part P1, and acquires a specific operation such as, for example, gripping of the hand as an operation of selecting the object 210.

Further, the user U superimposes the object 210 representing the pointer and the object 210 representing the selected content on the object 210 representing a desired operation such as, for example, a playback operation, and then deselects the object 210. Through the aforementioned operation, content desired by the user U is played back with the content playback function provided by the information processing device 100.

Note that the information processing device 100 need not necessarily control the display screen 200. For example, the information processing device 100 can provide only a function that does not use the display screen 200 such as, for example, a music content playback function, and can adjust the volume or quality of the output sound in response to a movement of the body part P1. In such a case, the display screen 200 need not be included in the system as described above.

Figure 2:
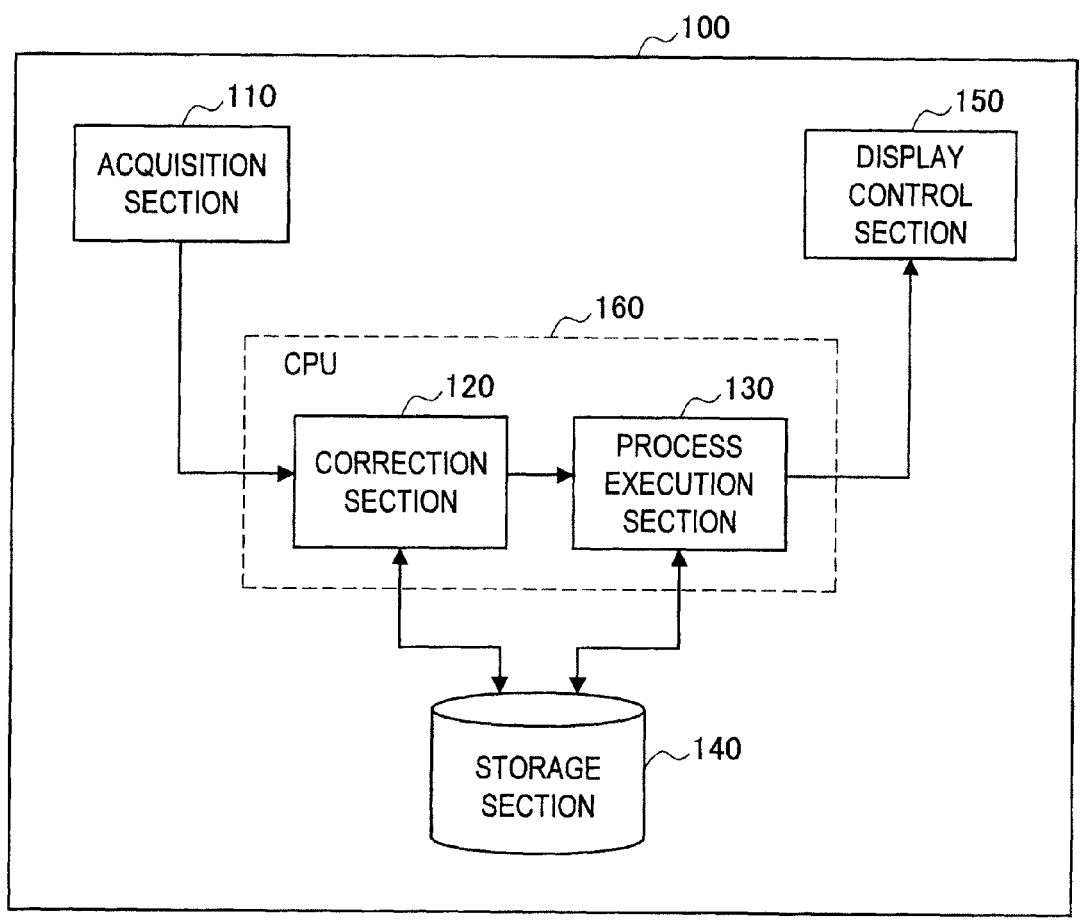
FIG. 2 is a block diagram showing the function and configuration of an information processing device in accordance with one embodiment of the present disclosure.

FIG. 2 is a block diagram showing the function and configuration of the information processing device 100 in accordance with one embodiment of the present disclosure. Referring to FIG. 2, the information processing device 100 includes the acquisition section 110, a correction section 120, a process execution section 130, a storage section 140, and a display control section 150. The functions of the correction section 120, the process execution section 130, and the like can be implemented by a CPU (Central Processing Unit) 160.

The acquisition section 110 acquires an operation vector V1 based on a movement of a body part P1 of the user U. For example, the acquisition section 110 recognizes the body part P1 through an image analysis or the like using a marker attached to the body part P1, a controller gripped by the body part P1, or speckle patterns of the body part P1, and further identifies the position of the body part P1 using a three-dimensional measurement method such as triangulation or TOF. The acquisition section 110 can also acquire the position of the center part P2 (not shown) of the body of the user U as described below. In order to implement the aforementioned functions, the acquisition section 110 can include a camera or infrared emitting and receiving portions, for example. In addition, the acquisition section 110 can also include a processor for analysis and measurement purposes. The functions of the processor can be implemented with the CPU 160.

The correction section 120 corrects the direction of the acquired operation vector V1. The operation vector corrected by the correction section 120 will be referred to as an operation vector V2. The correction section 120 creates the operation vector V2 by correcting the direction of the operation vector V1 acquired by the acquisition section 110 to any of one or a plurality of directions determined in advance for a process executed by the process execution section 130 described below. A specific correction process is described below. The function of the correction section 120 can be implemented with either the CPU 160 or a dedicated circuit configuration.

Herein, the directions determined in advance are the x-axis direction, the y-axis direction, and the z-axis direction. The correction section 120 determines to which of the directions the direction of the acquired operation vector V1 should be corrected through a determination process described below. Alternatively, the correction section 120 can use the acquired operation vector V1 as it is as the vector V2 through a determination process described below without correcting the direction of the operation vector V1. Note that in this specification, even when the direction of the acquired operation vector V1 is not corrected, a vector that has been subjected to a determination process of the correction section 120 is handled as a corrected operation vector V2.

The process execution section 130 executes a process in accordance with the corrected operation vector V2. The process execution section 130 moves the object 210 in the virtual three-dimensional space Sv, which is displayed on the display screen 200 by the display control section 150, in accordance with the corrected operation vector V2. The process executed by the process execution section 130 is not limited thereto, and can be any process related to the function provided by the information processing device 100. For example, the process execution section 130 can, when the information processing device 100 provides a music content playback function, adjust the sound volume or quality in accordance with the corrected operation vector V2. The function of the process execution section 130 can be implemented with either the CPU 160 or a dedicated circuit configuration.

Alternatively, the process execution section 130 can execute a plurality of types of processes in accordance with the functions provided by the information processing device 100. For example, the process execution section 130 can, when the information processing device 100 provides a movie content playback function, execute a process of moving the object 210 via the display control section 150, and can, when the information processing device 100 provides a music content playback function, execute a process of adjusting the sound volume or quality. That is, when the information processing device 100 is a PC, for example, the process execution section 130 can execute different processes in accordance with different applications provided by the PC. As described above, the direction to which the direction of the operation vector V1 is corrected by the correction section 120 is determined in advance to execute a process with the process execution section 130. Thus, when the process execution section 130 executes a plurality of types of processes, the direction to which the direction of the operation vector V1 is corrected by the correction section 120 can differ depending on the process to be executed.

The storage section 140 stores data used for the processing in the information processing device 100. The storage section 140 can be a storage device such as, for example, RAM (Random Access Memory) or ROM (Read Only Memory). Alternatively, the storage section 140 can be a removable storage medium such as an optical disc, a magnetic disk, or semiconductor memory, or can be a combination of a storage device and a removable storage medium.

The display control section 150 displays the objects 210 in the virtual three-dimensional space Sv using the display screen 200 shown in FIG. 1. The display control section 150 includes a processor that executes an arithmetic process for displaying an image, for example. The function of the processor can be implemented with, for example, a GPU (Graphics Processing Unit) or the CPU 160.

The CPU 160 implements the function of each section of the information processing device 100 as software by executing a program stored in the storage section 140. A program stored in the storage section 140 can be either provided by being stored in a removable storage medium or by being downloaded from a network via a communication section (not shown).

Note that the aforementioned components of the information processing device 100 need not necessarily be included in a single chassis. For example, such components can be arranged in different places on a network so that the functions of the information processing device 100 can be provided via the network in a cooperative manner.

2. CORRECTION OF OPERATION VECTOR

Next, correction of an operation vector in accordance with one embodiment of the present disclosure will be described with reference to FIGS. 3 to 8.

Figure 3:
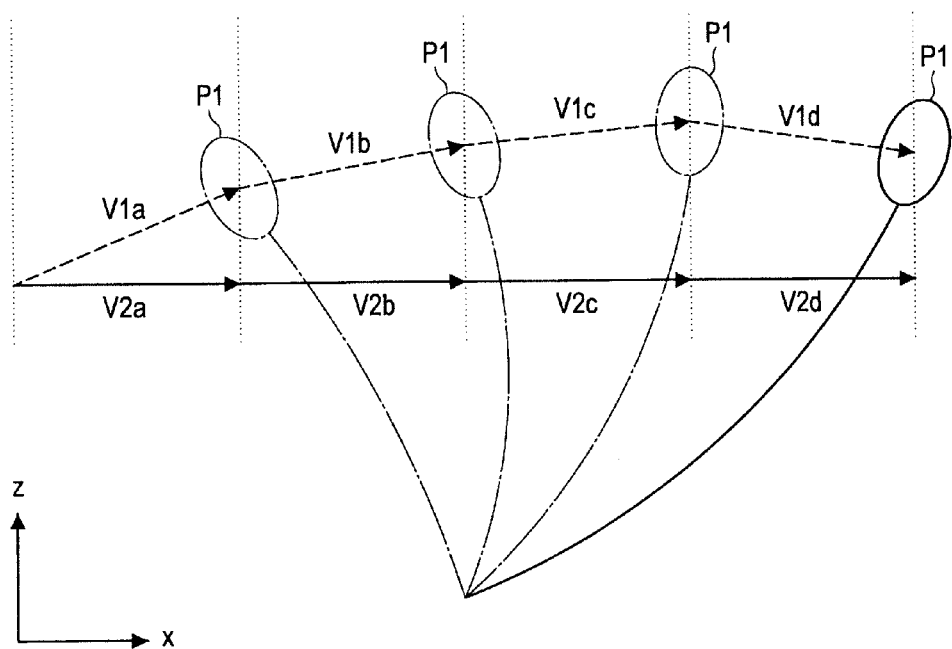
FIG. 3 is a diagram schematically illustrating correction of operation vectors in accordance with one embodiment of the present disclosure.

FIG. 3 is a diagram schematically illustrating correction of operation vectors V1 in accordance with one embodiment of the present disclosure. Referring to FIG. 3, the directions of operation vectors V1a to V1d, which have been acquired as the vectors connecting points on a movement path of the body part P1, are corrected to operation vectors V2a to V2d. Although the description will be hereinafter made of the x-axis direction as an example of the directions determined in advance for a process executed by the process execution section 130 of the information processing device 100 for the sake of simplicity, the same is true for the y-axis direction and the z-axis direction. In addition, although the description will be hereinafter made on the assumption that the operation vector V1 is located on the x-z plane, the same is true for a case in which the operation vector V1 includes components in the y-axis direction.

In order to move the object 210 in the x-axis direction, for example, the user U moves the body part P1 in an attempt to move it in a straight line along the x-axis direction in the three-dimensional space Sv. The operation vectors V1a to V1d are acquired by dividing a movement of the body part P1 at that time into frames, each of which represents a unit time based on which the acquisition section 110 performs a process, and acquiring a vector, which extends from the start point to the end point of the movement of the body part P1 in each frame, as the operation vector V1. A natural body movement of the user U is not necessarily linear. Thus, even when the user U intends to move the body part P1 in a straight line along the x-axis direction, the actual movement of the body part P1 will be curved. For this reason, it is considered that the operation vectors V1a to V1d are often acquired as the vectors connecting points on a curved line as shown, for example.

Thus, the correction section 120 corrects the directions of all of the acquired operation vectors V1a to V1d to the x-axis direction and thus creates the corrected operation vectors V2a to V2d. When the corrected operation vectors V2a to V2d are connected, it becomes possible to obtain a movement in a straight line along the x-axis direction corresponding to the acquired operation vectors V1a to V1d. When the process execution section 130 executes a process in accordance with the corrected operation vectors V2a to V2d, the user U can operate the information processing device 100 as intended.

(2-1. Determination based on Direction)

Figure 4:
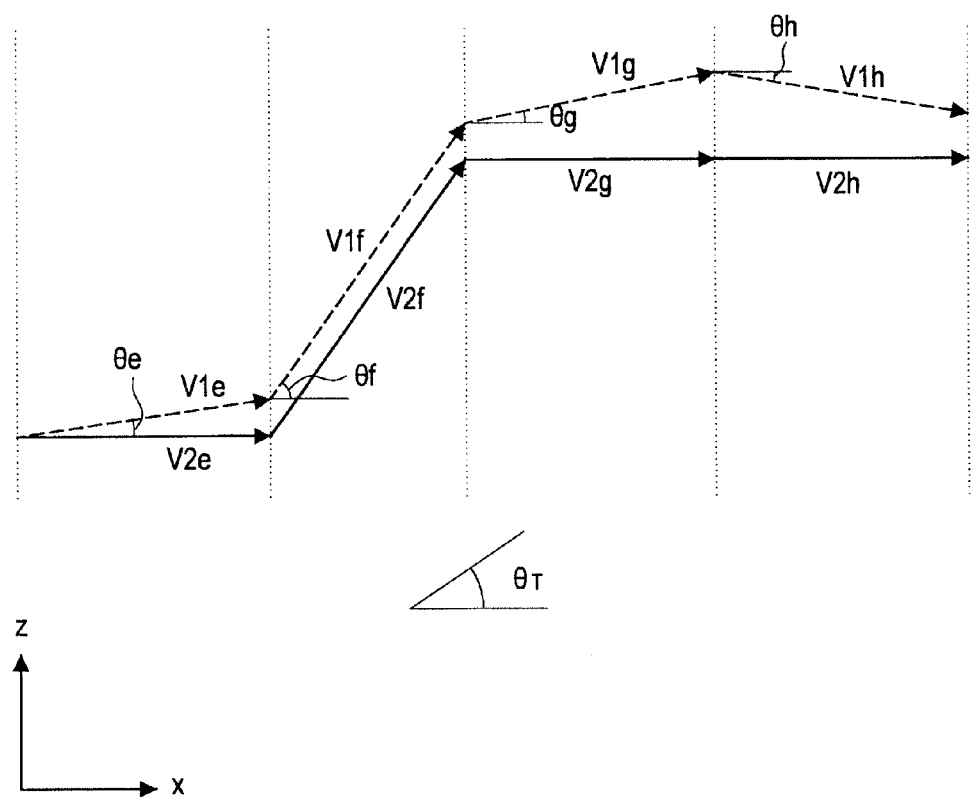
FIG. 4 is a diagram illustrating a determination of if correction should be performed based on the directions of the operation vectors in the case shown in FIG. 3.

FIG. 4 is a diagram illustrating a determination of if correction should be performed based on the directions of the operation vectors V1 in the case shown in FIG. 3. Referring to FIG. 4, if the directions of the acquired operation vectors V1e to V1h should be corrected is determined through comparison between an angle $\theta$ made by the direction of each operation vector V1 and the x-axis direction and a first threshold $\theta T$.

Even when the directions, which have been determined in advance for a process executed by the process execution section 130 of the information processing device 100, are the x-axis direction, the y-axis direction, and the z-axis direction, there may be cases in which the user intends to move the object 210 in a direction other than such directions. Hereinafter, description will be made with reference to FIGS. 4, 5, and 6 of a process of, when the user U intends to move the object 210 in a direction other than the x-axis direction, determining if the direction of the acquired operation vector V1 should be corrected to the x-axis direction with the correction section 120 so that the operation vector V1 for moving the object 210 will not be corrected to the x-axis direction.

The first threshold $\theta T$ used for the aforementioned determination can be set in advance in accordance with a function provided by the information processing device 100, for example, or can be adjustable using the result of the acquisition of the actual movement of the body part P1 with the acquisition section 110. When the angle $\theta$ made by the direction of the acquired operation vector V1 and the x-axis direction is less than the first threshold $\theta T$, that is, when the direction of the operation vector V1 does not deviate from the x-axis direction much, the correction section 120 determines that the user U is moving a body part P1 in an attempt to move it in the x-axis direction, and thus corrects the direction of the acquired operation vector V1 to the x-axis direction to thereby create an operation vector V2. Meanwhile, when the angle $\theta$ made by the direction of the acquired operation vector V1 and the x-axis direction is not less than the first threshold $\theta T$, that is, when the direction of the operation vector V1 deviates from the x-axis to a degree greater than or equal to a given degree, the correction section 120 determines that the user U is moving the body part P1 in an attempt to move it in a direction other than the x-axis direction, and thus uses the acquired operation vector V1 as it is as an operation vector V2 without correcting the direction thereof.

In the example shown in the drawing, an angle θe made by the direction of the acquired operation vector V1e and the x-axis is less than the first threshold θT. Thus, the correction section 120 corrects the direction of the operation vector V1e to the x-axis direction to thereby create a corrected operation vector V2e. Meanwhile, an angle θf made by the direction of the acquired operation vector V1f and the x-axis direction is greater than the first threshold θT. Thus, the correction section 120 uses the operation vector V1f as it is as an operation vector V2f without correcting the direction thereof. Further, an angle θg made by the direction of the acquired operation vector V1g and the x-axis direction is less than the first threshold θT. Thus, the correction section 120 corrects the direction of the operation vector V1g to the x-axis direction to thereby create a corrected operation vector V2g. Likewise, an angle θh made by the direction of the acquired operation vector V1h and the x-axis direction is less than the first threshold θT. Thus, the correction section 120 corrects the direction of the operation vector V1h to the x-axis direction to thereby create a corrected operation vector V2h.

Through the aforementioned determination using the angle θ, the acquired operation vectors V1e to V1h are classified into the operation vectors V1e, V1g, and V1h whose directions are corrected to the x-axis direction, and the operation vector V1h whose direction is not corrected. Thus, the correction section 120 corrects the direction of each of the operation vectors V1e, V1g, and V1h to the x-axis direction and does not correct the direction of the operation vector V1f. Accordingly, the user U can, when intending to move the object 210 "roughly in the x-axis direction," accurately move the object 210 in the x-axis direction, and can, when intending to move the object 210 "in a direction that is obviously different from the x-axis direction," move the object 210 in the intended direction that is different from the x-axis direction.

(2-2. Determination Based on Magnitude)

Figure 5:
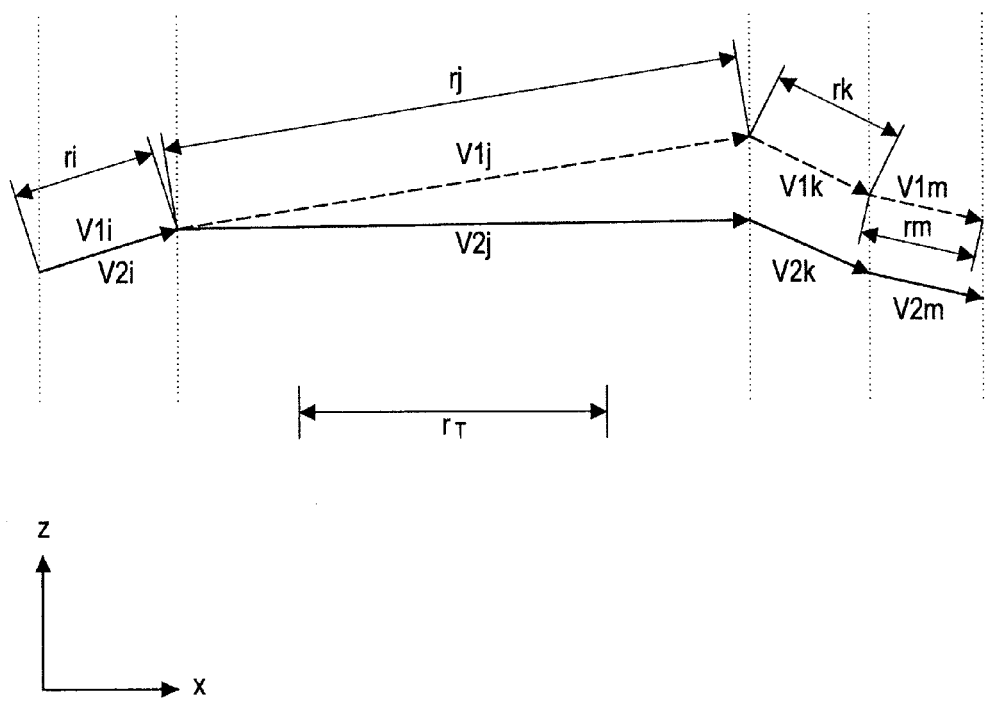
FIG. 5 is a diagram illustrating a determination of if correction should be performed based on the magnitudes of the operation vectors in the case shown in FIG. 3.

FIG. 5 is a diagram illustrating a determination of if correction should be performed based on the magnitudes of the operation vectors V1 in the case shown in FIG. 3. Referring to FIG. 5, if the directions of the acquired operation vectors V1i to V1m should be corrected is determined through comparison between the magnitude r of each operation vector V1 and a second threshold rT.

The second threshold rT used for the aforementioned determination can be set in advance in accordance with a function provided by the information processing device 100, for example, or can be adjustable using the result of the acquisition of the actual movement of the body part P1 with the acquisition section 110. When the magnitude r of the acquired operation vector V1 is greater than the second threshold rT, that is, when the body part P1 has moved rapidly to a certain degree, the correction section 120 determines that the user U is moving the body part P1 in an attempt to roughly move it, and thus corrects the direction of the acquired operation vector V1 to the x-axis direction to thereby cerate an operation vector V2. Meanwhile, when the magnitude r of the acquired operation vector V1 is not greater than the second threshold rT, that is, when the body part P1 has moved slowly, the correction section 120 determines that the user U is moving the body part P1 in an attempt to move it finely, and thus uses the acquired operation vector V1 as it is as an operation vector V2 without correcting the direction thereof.

In the example shown in the drawing, the magnitude ri of the acquired operation vector V1i is less than the second threshold rT. Thus, the correction section 120 uses the operation vector V1i as it is as an operation vector V2i without correcting the direction thereof. Meanwhile, the magnitude rj of the acquired operation vector V1j is greater than the second threshold rT. Thus, the correction section 120 corrects the direction of the operation vector V1j to the x-axis direction to thereby create a corrected operation vector V2j. Further, the magnitude rk of the acquired operation vector V1k is less than the second threshold rT. Thus, the correction section 120 uses the operation vector V1k as it is as an operation vector V2k without correcting the direction thereof. Likewise, the magnitude rm of the acquired operation vector V1m is less than the second threshold rT. Thus, the correction section 120 uses the operation vector V1m as it is as an operation vector V2m without correcting the direction thereof.

Through the aforementioned determination based on the magnitude r of each operation vector, the acquired operation vectors V1i to V1m are classified into the operation vector V1j whose direction is corrected to the x-axis direction, and the operation vectors V1i, V1k, and V1m whose directions are not corrected. Thus, the correction section 120 corrects the direction of the operation vector V1j to the x-axis direction and does not correct the direction of the operation vector V1i, V1k, or V1m. Accordingly, the user U can, when intending to "roughly move" an object, for example, automatically move the object in the x-axis direction without being particularly aware of it, and can, when intending to "finely adjust" an object, move the object in the intended direction.

Note that the determination using the second threshold rT can be combined with the determination using the first threshold θT. For example, the direction of the operation vector V1 can be corrected to the x-axis direction when the magnitude of the operation vector V1 is greater than the second threshold rT and the angle θ made by the direction of the operation vector and the x-axis is less than the first threshold θT. Alternatively, the value of the first threshold θT can be changed depending on whether or not the magnitude of the operation vector V1 is greater than the second threshold rT. Specifically, the value of the first threshold θT of when the magnitude of the operation vector V1 is greater than the second threshold rT can be set higher than the value of the first threshold θT of when the magnitude of the operation vector V1 is not greater than the second threshold rT.

(2-3. Determination Based on Position)

Figure 6:
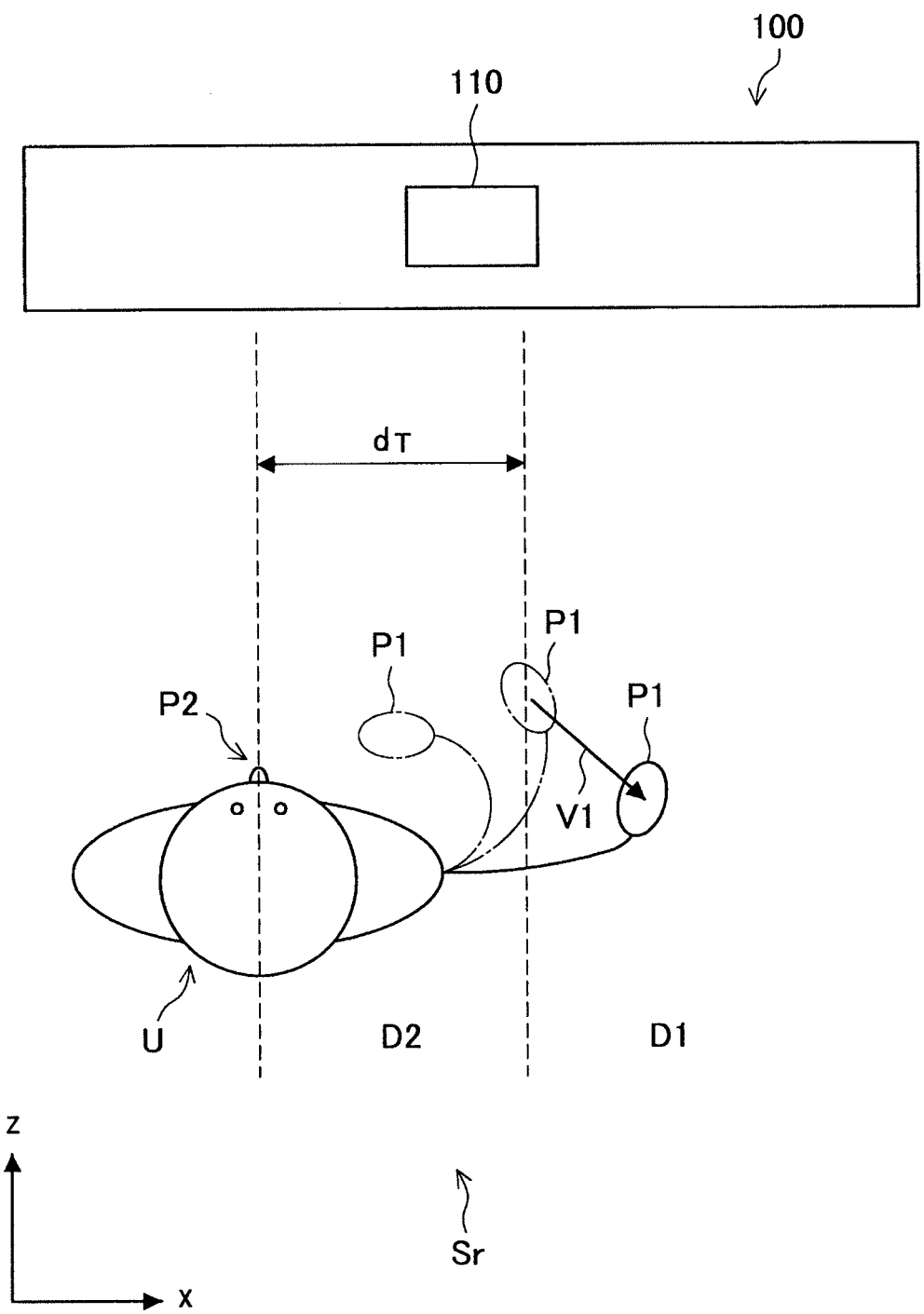
FIG. 6 is a diagram illustrating a determination of if correction should be performed based on the position of the user in the case shown in FIG. 3.

FIG. 6 is a diagram illustrating a determination of if correction should be performed based on the position of the user U in the case shown in FIG. 3. Referring to FIG. 6, if the direction of the operation vector V1 should be corrected is determined by setting a region D1 whose distance from the center part P2 of the body of the user U is greater than a distance dT, which is a third threshold, and a region D2 other than that.

In the case shown in the drawing, the acquisition section 110 of the information processing device 100 acquires the position of the center part P2 of the body using, for example, a method that is similar to the method for acquiring the position of the body part P1 of the user U. The correction section 120 sets a region D1 whose distance from the center part P2 of the body is greater than the distance dT, which is the third threshold, and a region D2 other than that in the three-dimensional space Sr. The distance dT can be set in advance in accordance with a function provided by the information processing device 100, for example, or can be adjustable using the result of the acquisition of the actual movement of the body part P1.

Herein, the region D2 that is close to the center part P2 of the body is a region where the user U is moving the body part P1 in a position close to the front part of the body, and is a region where it is estimated to be relatively easy for the body part P1 to be moved in a straight line along the x-axis direction. Meanwhile, the region D1 that is far from the center part P2 of the body is a region where the user U is moving the body part P1 in a position far from the front part of the body, and is a region where it is estimated to be difficult for the body part P1 to be moved in a straight line along the x-axis direction due to the structure of the joint, for example.

Thus, in the example shown in the drawing, when the body part P1 has moved in the region D1, that is, when the body part P1 has moved in a region that is far from the center part P2 of the body of the user U to a certain degree, the correction section 120 corrects the direction of the acquired operation vector V1 to a direction determined in advance for a process, to thereby create an operation vector V2. Meanwhile, when the body part P1 has moved in the region D2, that is, when the body part P1 has moved in a region that is close to the center part P2 of the body of the user U, the correction section 120 uses the acquired operation vector V1 as it is as the operation vector V2 without changing the direction thereof.

As described above, the correction section 120 determines if the direction of the acquired operation vector V1 should be corrected by setting the region D1 and the region D2. Accordingly, the user U can, in the region D2 where it is relatively easy for the body part P1 to be moved in a straight line along the x-axis direction, reflect a movement of the body part P1 into a movement of the object 210 as it is, and can, in the region D1 where it is relatively difficult for the body part P1 to be moved in a straight line along the x-axis direction, have a movement direction of the object 210 corrected to the x-axis direction even when the movement direction of the body part P1 has deviated from the x-axis direction to some degree.

(2-4. Determination for Plurality of Directions)

Figure 7:
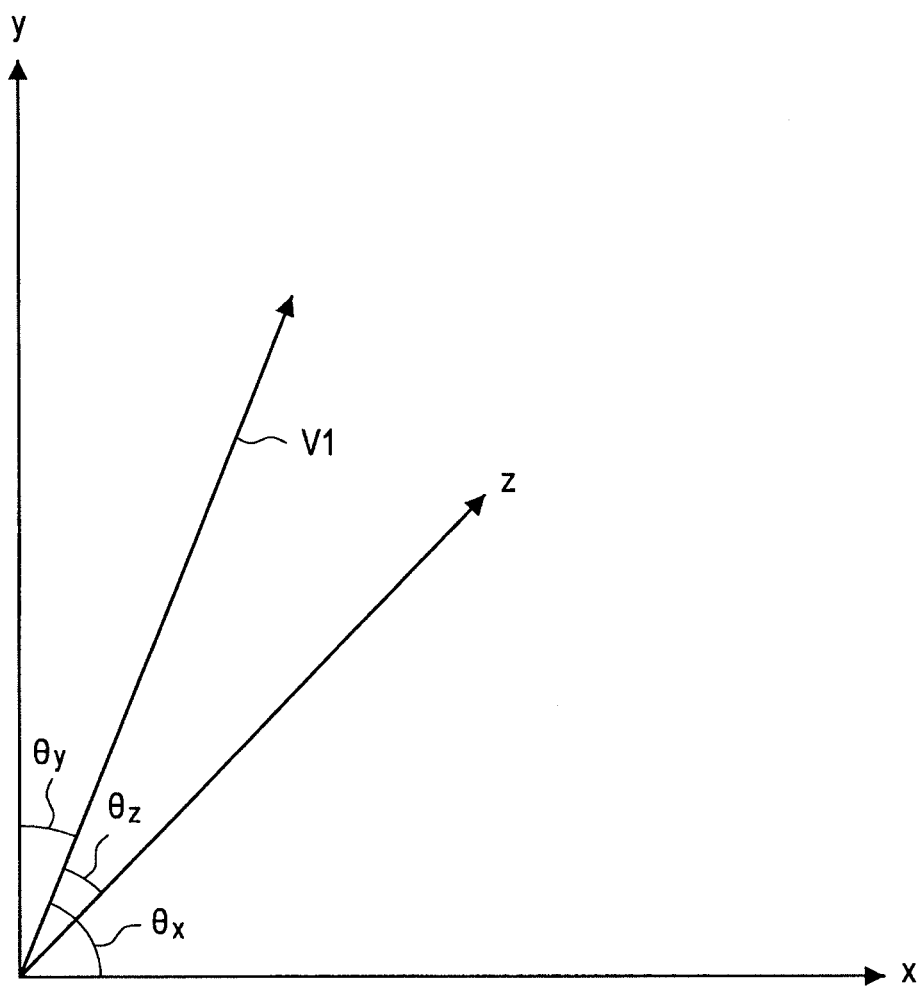
FIG. 7 is a diagram illustrating a determination process for a plurality of directions in correction of an operation vector in accordance with one embodiment of the present disclosure.

FIG. 7 is a diagram illustrating a determination process for a plurality of directions in correction of an operation vector in accordance with one embodiment of the present disclosure. Referring to FIG. 7, the direction of the acquired operation vector V1 makes an angle of $\theta x$ with the x-axis direction, makes an angle of $\theta y$ with the y-axis direction, and makes an angle of $\theta z$ with the z-axis direction. Note that each of the x-axis direction, the y-axis direction, and the z-axis direction is a direction determined in advance for a process executed by the process execution section 130 of the information processing device 100. In addition, the first threshold $\theta T$ is determined in advance as a first threshold to be used for a determination in the correction of the direction of the operation vector V1.

In the example shown in the drawing, the correction section 120 determines to which of the x-axis direction, the y-axis direction, and the z-axis direction the direction of the acquired operation vector V1 should be corrected, or determines that correction should not be performed. Such a determination process using the first threshold $\theta T$ will be hereinafter described with reference to FIG. 8.

Figure 8:
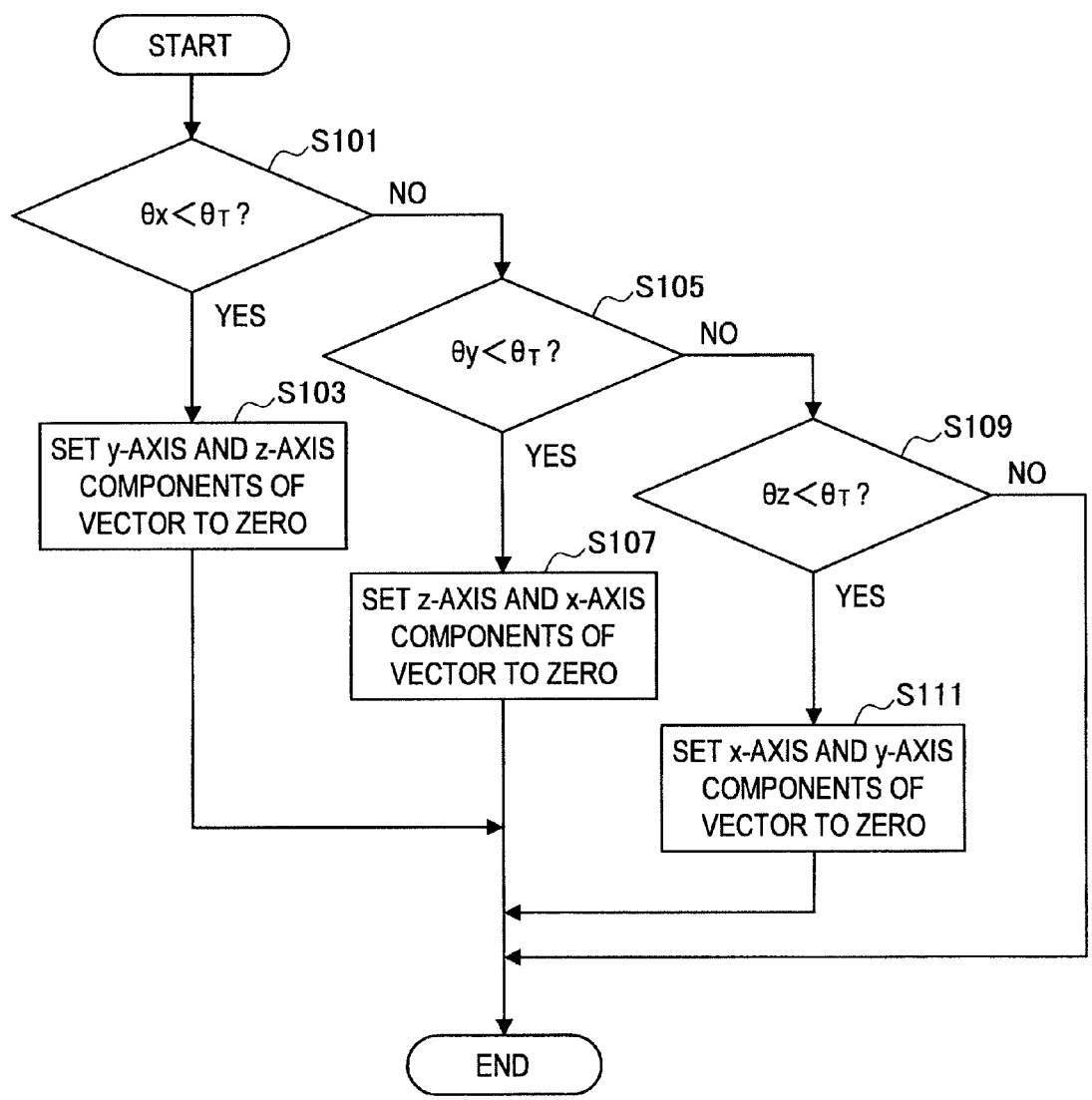
FIG. 8 is a flowchart showing a determination process for a plurality of directions in the case shown in FIG. 7.

FIG. 8 is a flowchart showing a determination process for a plurality of directions in the case shown in FIG. 7. Referring to FIG. 8, each of the angles $\theta x$, $\theta y$, and $\theta z$, which are the angles made by the direction of the acquired operation vector V1 and the x-axis direction, the y-axis direction, and the z-axis direction, respectively, is compared with the first threshold $\theta T$ to determine to which direction the direction of the operation vector V1 should be corrected or to determine that correction should not be performed.

First, the correction section 120 determines if the angle $\theta x$ made by the direction of the acquired operation vector V1 and the x-axis direction is less than the first threshold $\theta T$ (step S101). Herein, if the angle $\theta x$ is determined to be less than the first threshold $\theta T$, the correction section 120 sets the components in the y-axis direction and the z-axis direction of the operation vector V1 to zero (step S103). That is, the correction section 120 corrects the direction of the operation vector V1 to the x-axis direction.

Meanwhile, when the angle $\theta x$ is not determined to be less than the first threshold $\theta T$ in step S101, the correction section 120 determines if the angle $\theta y$ made by the direction of the acquired operation vector V1 and the y-axis direction is less than the first threshold $\theta T$ (step S105). Herein, if the angle $\theta y$ is determined to be less than the first threshold $\theta T$, the correction section 120 sets the components in the z-axis direction and the x-axis direction of the operation vector V1 to zero (step S107). That is, the correction section 120 corrects the direction of the operation vector V1 to the y-axis direction.

Meanwhile, when the angle $\theta y$ is not determined to be less than the first threshold $\theta T$ in step S105, the correction section 120 determines if the angle $\theta z$ made by the direction of the acquired operation vector V1 and the z-axis direction is less than the first threshold $\theta T$ (step S109). Herein, if the angle $\theta z$ is determined to be less than the first threshold $\theta T$, the correction section 120 sets the components in the x-axis direction and the y-axis direction of the operation vector V1 to zero (step S111). That is, the correction section 120 corrects the direction of the operation vector V1 to the z-axis direction.

Meanwhile, when the angle $\theta z$ is not determined to be less than the first threshold $\theta T$ in step S109, the correction section 120 does not correct the direction of the acquired operation vector V1, and terminates the process.

If any of the angles $\theta x$, $\theta y$, and $\theta z$, which are the angles made by the direction of the acquired operation vector V1 and the x-axis direction, the y-axis direction, and the z-axis direction, respectively, is determined to be less than the first threshold $\theta T$ in the aforementioned process, the direction of the operation vector V1 is corrected to a direction corresponding to the angle. In order to prevent the range of the x-axis direction, the y-axis direction, and the z-axis direction, to which the direction of the operation vector V1 is corrected, from overlapping one another, the first threshold $\theta T$ is desirably set to a value less than or equal to 45° (=a half of the angle made by each axis).

Although the aforementioned example has illustrated a case in which the angles $\theta x$, $\theta y$, and $\theta z$ are the absolute values of the angles made by the acquired operation vector V1 and the x-axis direction, the y-axis direction, and the z-axis direction, respectively, the angles are not limited thereto. The angles $\theta x$, $\theta y$, and $\theta z$ can be acquired as positive or negative values. For example, the angle $\theta x$ can be set to a positive value if the z-axis components of the operation vector V1 have a positive value, and can be set to a negative value if the z-axis components of the operation vector V1 have a negative value. In such a case, it is possible to determine if the direction of the operation vector V1 should be corrected to the x-axis direction depending on whether or not the angle θx is within a predetermined range of angles (e.g., a range of −30° to)+10° instead of using the comparison between the angle θx and the first threshold θT. The correction section 120 can perform a similar determination for the angles θy and θz.

3. VARIATIONS

Next, two variations of a correction pattern of the direction of an operation vector in accordance with one embodiment of the present disclosure will be described with reference to FIGS. 9 and 10.

(3-1. Variation of Correction Pattern (1))

Figure 9:
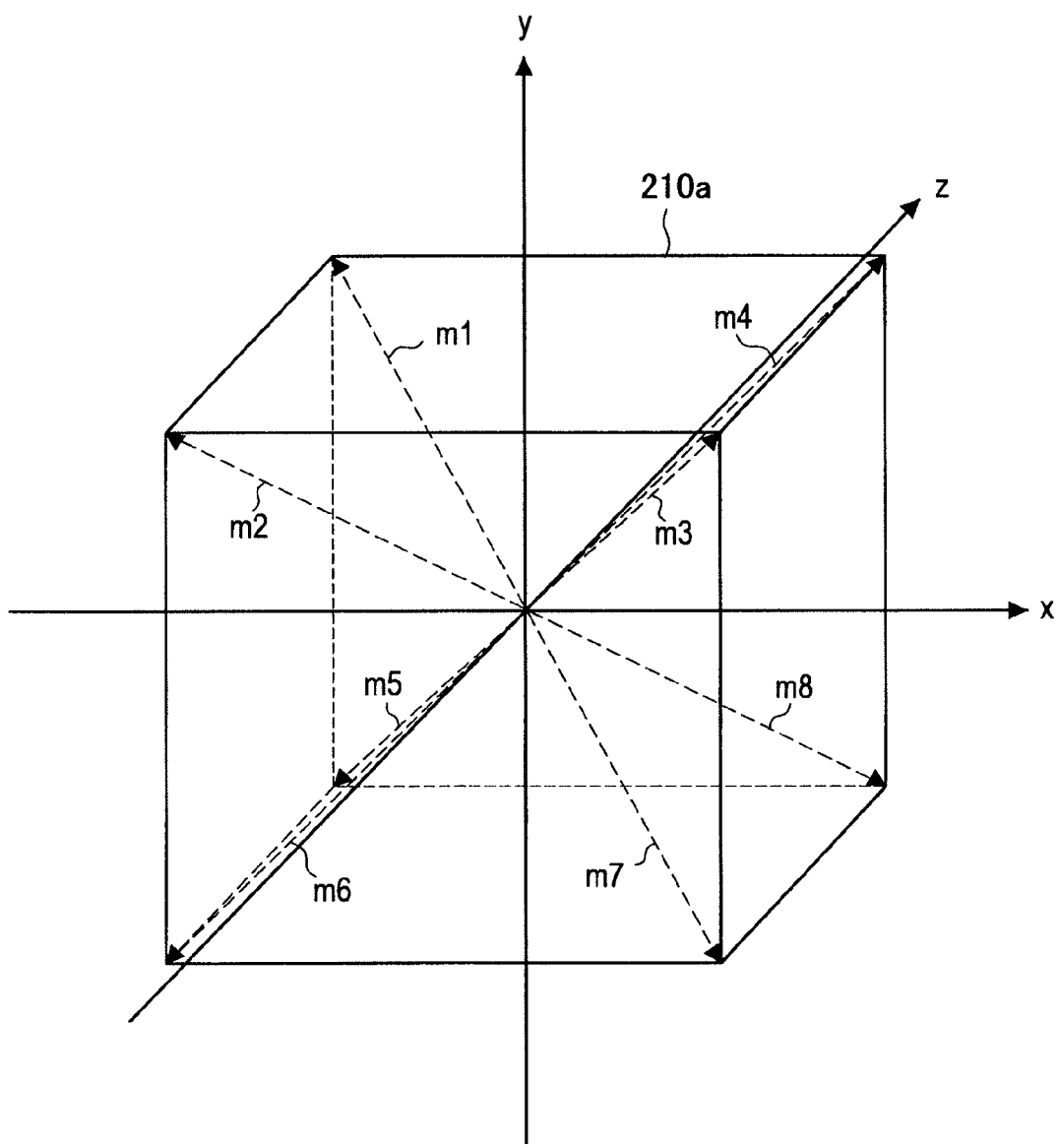
FIG. 9 is a diagram showing a variation of a correction pattern of the direction of an operation vector in accordance with one embodiment of the present disclosure.

FIG. 9 is a diagram showing a variation of a correction pattern of the direction of the operation vector V1 in accordance with one embodiment of the present disclosure. Referring to FIG. 9, an object 210a is an approximate cubic made up of sides in the x-axis direction, the y-axis direction, and the z-axis direction. A correction pattern in accordance with the present variation includes, in addition to the x-axis direction, the y-axis direction, and the z-axis direction, directions that extend from the center of the object 210a to the respective vertices of the object 210a, namely, directions m1 to m8 that extend from the center of the approximate cubic to the respective vertices. In this case, the aforementioned 11 directions are the directions determined in advance for a process executed by the process execution section 130 of the information processing device 100.

The correction pattern in accordance with the present variation is effectively used when, for example, the object 210a is frequently moved in the diagonal directions thereof. In such a case, the user U may frequently move the object 210a in the directions m1 to m8 in addition to the x-axis direction, the y-axis direction, and the z-axis direction. Thus, it would be effective to correct a movement of a body part P1 in a curved line to a movement in a straight line along one of the directions m1 to m8.

(3-2. Variation of Correction Pattern (2))

Figure 10:
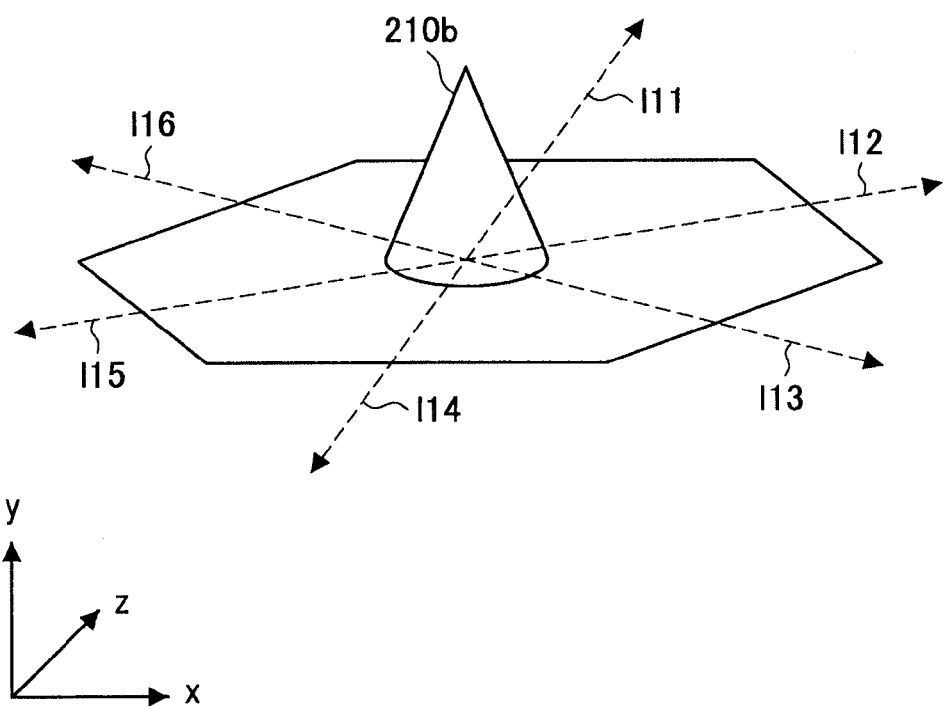
FIG. 10 is a diagram showing another variation of a correction pattern of the direction of an operation vector in accordance with one embodiment of the present disclosure.

FIG. 10 is a diagram showing another variation of a correction pattern of the direction of the operation vector V1 in accordance with one embodiment of the present disclosure. Referring to FIG. 10, an object 210b is an object arranged on a cell that is approximately hexagonal in shape and is arranged on the x-z plane. The correction pattern in accordance with the present variation includes directions 111 to 116 that extend from the center to the respective sides of the cell on which the object 210 is arranged. In such a case, the aforementioned six directions are the directions determined in advance for a process executed by the process execution section 130 of the information processing device 100.

The correction pattern in accordance with the present variation is effectively used when, for example, a cell that is approximately hexagonal in shape is arranged on the x-z plane in a game or the like, and the user U moves another object 210c over the cell. In such a case, the user U frequently moves the object 210c in the direction of a side of an adjacent cell. Thus, correcting a movement of the user to one of the directions 111 to 116 would be effective.

4. CONCLUSION

In one embodiment of the present disclosure, the correction section 120 of the information processing device 100 can correct the direction of the acquired operation vector V1 to any of one or a plurality of directions determined in advance for a process executed by the process execution section 130. According to such a configuration, the direction to which the acquired operation vector V1 should be corrected can be determined in accordance with a process to be executed by the process execution section 130. The number of the directions can be more than one and can be provided as a plurality of directions that the user U frequently uses in a process. When the information processing device 100 has a plurality of functions, the direction to which the operation vector V1 should be corrected is determined in accordance with each function. Thus, the user U can utilize the optimum correction of the operation vector V1 for each function used.

In addition, the correction section 120 can, when the angle θ, which is made by the direction of the acquired operation vector V1 and any of one or a plurality of directions determined in advance for a process executed by the process execution section 130, is less than the first threshold θT, correct the direction of the operation vector V1. According to such a configuration, it is possible to distinguish between a case in which the user U is moving a body part P1 by intending to move it in any of the predetermined directions and a case in which the user U is moving a body part P1 by intending to move it in a direction different from the predetermined directions, using a deviation of the angle from the predetermined directions. Accordingly, it is possible to switch whether or not to correct the direction of the operation vector V1 in accordance with the needs of the user U.

The acquisition section 110 can acquire the operation vector V1 as a vector going from the start point to the end point of a movement of a body part P1 in a unit time based on which the acquisition section 110 performs a process. According to such a configuration, the movement speed of the body part P1 can be estimated from the magnitude r of the operation vector V1.

In addition, the correction section 120 can, when the magnitude of the acquired operation vector V1 is greater than the second threshold rT, correct the direction of the acquired operation vector V1. According to such a configuration, it is possible to distinguish between a case in which the user U is moving a body part P1 by intending to roughly move an object and a case in which the user U is moving a body part P1 by intending to finely adjust an object, using the movement speed of the body party P1. Accordingly, it is possible to switch whether or not to correct the direction of the operation vector V1 in accordance with the needs of the user U.

Further, the acquisition section 110 can acquire the position of the center part P2 of the body of the user U and can correct the direction of the operation vector V1 for a movement of a body part P1 in the region D1 whose distance from the center part P2 of the body is greater than the distance dT that is the third threshold. According to such a configuration, it is possible to distinguish between a case in which the user U is moving a body part P1 in a region where it is relatively easy for the body part P1 to be moved in a straight line and a case in which the user U is moving a body part P1 in a region where it is relatively difficult for the body part P1 to be moved in a straight line, using the distance from the center part P2 of the body of the user U to the body party P1. Accordingly, it is possible to switch whether or not to correct the direction of the operation vector V1 in accordance with the needs of the user U.

The acquired operation vector V1 can be a three-dimensional vector that can contain components in each of the x-axis direction, the y-axis direction, and the z-axis direction that correspond to the width direction, the height direction, and the depth direction, respectively, of the three-dimensional space Sr in which the user U is located. According to such a configuration, it is possible to acquire a movement in a straight line by correcting the direction of the operation vector V1 that contains components in the z-axis (depth) direction in which a body part P1 is particularly difficult to be moved in a straight line.

The information processing device 100 further includes the display control section 150 for displaying the object 210 in a virtual three-dimensional space Sv, and the process execution section 130 can move the object 210 displayed by the display control section 150 in accordance with the corrected operation vector V2. According to such a configuration, it is possible to, in a process of moving the object 210 whose direction is visually perceived by the user U, move the object 210 in a straight line as intended by the user U, and thus to improve the operability of the object 210 for the user U.

In addition, the correction section 120 can correct the direction of the acquired operation vector V1 to any of the x-axis (width) direction, the y-axis (height) direction, and the z-axis (depth) direction in the virtual three-dimensional space Sv. According to such a configuration, the object 210 can be moved in a straight line as intended by the user along any of the width, height, and depth directions that are particularly easily recognized by the user U, whereby the operability of the object 210 for the user U can be improved.

Further, the correction section 120 can, when the direction of the acquired operation vector V1 makes an angle less than the angle θT, which is a fourth threshold, with any of the x-axis (width) direction, the y-axis (height) direction, and the z-axis (depth) direction in the virtual three-dimensional space Sv, correct the direction of the operation vector. According to such a configuration, it is possible to switch whether or not to correct the direction of the operation vector V1 to any of the width, height, and depth directions that are particularly easily recognized by the user U, in accordance with the needs of the user U.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The present disclosure contains subject matter related to that disclosed in Japanese Priority Patent Application JP 2010-184006 filed in the Japan Patent Office on Aug. 19, 2010, the entire content of which is hereby incorporated by reference.

What is claimed is:

1. An information processing device comprising:
an acquisition section configured to acquire an operation vector based on image analysis of a movement of a body part of a user, wherein the image analysis comprises recognizing the body part of the user and identifying a position of the body part of the user throughout the movement by dividing the movement into frames, wherein each frame represents a predetermined unit of time during the movement, and the acquired operation vector is a vector going from a start point to an end point of the movement in the predetermined unit of time for each frame;
a correction section configured to correct a direction of the acquired operation vector to a predetermined linear direction of a plurality of predetermined linear directions, wherein the correction section corrects the direction of the acquired operation vector when an angle between a linear direction of the acquired operation vector and the predetermined linear direction of the plurality of predetermined linear directions is less than an angular threshold; and
a process execution section configured to execute a process in accordance with the corrected operation vector, wherein the acquisition section, the correction section, and the process execution section are each implemented via at least one processor.

2. The information processing device according to claim 1, wherein the correction section corrects the direction of the acquired operation vector when a magnitude of the acquired operation vector is greater than a magnitude threshold.

3. The information processing device according to claim 1, wherein
the acquisition section acquires a position of a center part of the body of the user, and
the correction section corrects the direction of the acquired operation vector when the movement of the body part is identified as being in a region whose distance from the position of the center part of the body is greater than a distance threshold.

4. The information processing device according to claim 1, wherein the acquired operation vector is a three-dimensional vector containing components in at least one of a width direction, a height direction, and a depth direction of a three-dimensional space in which the user is located.

5. The information processing device according to claim 4, further comprising a display control section configured to display an object in a virtual three-dimensional space, wherein the process execution section moves the object displayed by the display control section in accordance with the corrected operation vector.

6. The information processing device according to claim 5, wherein the correction section corrects the linear direction of the acquired operation vector to any of the width direction, the height direction, and the depth direction of the virtual three-dimensional space.

7. The information processing device according to claim 6, wherein the correction section corrects the direction of the operation vector when the direction of the acquired operation vector makes an angle that is less than a second angular threshold with one of the width direction, the height direction, and the depth direction of the virtual three-dimensional space.

8. An information processing method, performed via at least one processor, the method comprising:
acquiring an operation vector based on image analysis of a movement of a body part of a user, wherein the image analysis comprises recognizing the body part of the user and identifying a position of the body part of the user throughout the movement by dividing the movement into frames, wherein each frame represents a predetermined unit of time during the movement, and the acquired operation vector is a vector going from a start point to an end point of the movement in the predetermined unit of time for each frame;
correcting a direction of the acquired operation vector to a predetermined linear direction of a plurality of predetermined linear directions, wherein the correction section corrects the direction of the acquired operation vector when an angle between a linear direction of the acquired operation vector and the predetermined linear direction of the plurality of predetermined linear directions is less than an angular threshold; and executing a process in accordance with the corrected operation vector.

9. A non-transitory computer-readable medium having embodied thereon a program, which when executed by a processor of an image processing apparatus causes the processor to perform a method, the method comprising:

acquiring an operation vector based on image analysis of a movement of a body part of a user, wherein the image analysis comprises recognizing the body part of the user and identifying a position of the body part of the user throughout the movement by dividing the movement into frames, wherein each frame represents a predetermined unit of time during the movement, and the acquired operation vector is a vector going from a start point to an end point of the movement in the predetermined unit of time for each frame;

correcting a direction of the acquired operation vector; and executing a process in accordance with the corrected operation vector.

10. The information processing device of claim 1, wherein the acquisition section is further configured to acquire a plurality of operation vectors based on image analysis of movements of a plurality of body parts of the user, and wherein the image analysis comprises recognizing the plurality of body parts of the user and identifying a position of each of the plurality of body parts of the user throughout the movements using speckle patterns.

11. The information processing device of claim 1, wherein the acquisition section is further configured to acquire a plurality of operation vectors based on image analysis of movements of at least one body part of each of a plurality of users, and wherein the image analysis comprises recognizing the at least one body part of each of the plurality of users and identifying a position of each recognized body part of each of the plurality of users throughout the movements using speckle patterns.

12. The information processing device of claim 1, wherein the acquisition section is configured to acquire the operation vector without a secondary device attached to the body part of the user.

13. The information processing device of claim 1, wherein identifying the position of the body part of the user throughout the movement comprises using triangulation.

14. The information processing device of claim 1, wherein identifying the position of the body part of the user throughout the movement comprises using time of flight.

15. The information processing method of claim 8, wherein acquiring the operation vector is performed without a secondary device attached to the body part of the user.

16. The non-transitory computer-readable medium of claim 9, wherein acquiring the operation vector is performed without a secondary device attached to the body part of the user.

17. The information processing device of claim 1, wherein the acquisition section comprises a camera or infrared technology located opposite the user, wherein the camera maps a physical space in which the user exists, and wherein the image analysis uses speckle patterns to recognize the body part of the user and identify the position of the body part of the user throughout the movement.

* * * * *